United States Patent
Thiel et al.

(10) Patent No.: US 11,513,211 B2
(45) Date of Patent: Nov. 29, 2022

(54) ENVIRONMENT MODEL USING CROSS-SENSOR FEATURE POINT REFERENCING

(71) Applicant: Continental Automotive GmbH, Hannover (DE)

(72) Inventors: Christian Thiel, Oberaudorf (DE); Paul Barnard, Stoke St Michael / Somerset (GB); Bingtao Gao, Sichuan (CN)

(73) Assignee: Continental Automotive GmbH, Hannover (DE)

( * ) Notice: Subject to any disclaimer, the term of this patent is extended or adjusted under 35 U.S.C. 154(b) by 776 days.

(21) Appl. No.: 16/464,622

(22) PCT Filed: Nov. 29, 2016

(86) PCT No.: PCT/CN2016/107748
§ 371 (c)(1),
(2) Date: May 28, 2019

(87) PCT Pub. No.: WO2018/098635
PCT Pub. Date: Jun. 7, 2018

(65) Prior Publication Data
US 2021/0088648 A1    Mar. 25, 2021

(51) Int. Cl.
*G01S 13/86* (2006.01)
*G06T 7/73* (2017.01)
(Continued)

(52) U.S. Cl.
CPC .......... *G01S 13/867* (2013.01); *G01S 13/426* (2013.01); *G01S 13/89* (2013.01); *G06N 20/00* (2019.01);
(Continued)

(58) Field of Classification Search
CPC ...... G01S 13/867; G01S 13/89; G01S 13/426; A61C 13/2255; A61B 5/1128;
(Continued)

(56) References Cited

U.S. PATENT DOCUMENTS

| | | | |
|---|---|---|---|
| 9,098,753 B1 | 8/2015 | Zhu | G06K 9/00805 |
| 2008/0013103 A1 | 1/2008 | Inoue et al. | 356/610 |

(Continued)

FOREIGN PATENT DOCUMENTS

| | | | | |
|---|---|---|---|---|
| CN | 101105392 A | 1/2008 | | G01B 11/00 |
| CN | 103733084 A | 4/2014 | | G01S 5/02 |

(Continued)

OTHER PUBLICATIONS

International Search Report and Written Opinion, Application No. PCT/CN2016/107748, 9 pages, dated Jul. 6, 2017.
(Continued)

*Primary Examiner* — Phuoc H Doan
(74) *Attorney, Agent, or Firm* — Continental Automotive GmbH

(57) ABSTRACT

Some embodiments include a method of generating an environment reference model for positioning comprising: receiving multiple data sets representing a scanned environment including information about a type of sensor used and data for determining an absolute position of objects or feature points represented by the data sets; extracting one or more objects or feature points from each data set; determining a position of each object or feature point in a reference coordinate system; generating a three-dimensional vector representation of the scanned environment aligned with the reference coordinate system including representation of the objects or feature points at corresponding locations; creating links between the objects or feature points in the three-dimensional vector model with an identified type of sensor by which they can be detected in the environment; and storing the three-dimensional vector model representation and the links in a retrievable manner.

8 Claims, 2 Drawing Sheets

(51) Int. Cl.
*G06N 20/00* (2019.01)
*G01S 13/42* (2006.01)
*G01S 13/89* (2006.01)
*G06T 17/05* (2011.01)
*G06V 10/40* (2022.01)

(52) U.S. Cl.
CPC ............... *G06T 7/73* (2017.01); *G06T 17/05* (2013.01); *G06V 10/40* (2022.01); *G06T 2207/30252* (2013.01)

(58) Field of Classification Search
CPC .... G06K 9/00348; G06K 9/46; H04N 13/383; G02B 26/08; G06T 17/05; G06T 7/73; G06N 26/00
USPC .......................................... 342/52, 201; 701/1
See application file for complete search history.

(56) References Cited

U.S. PATENT DOCUMENTS

2011/0243455 A1* 10/2011 Miyajima .......... G01C 21/3602
382/201
2012/0303176 A1* 11/2012 Wong ...................... G01S 17/89
701/1

FOREIGN PATENT DOCUMENTS

| | | | |
|---|---|---|---|
| EP | 2 166 375 B1 | 10/2015 | ............. G01C 21/00 |
| JP | 2011-215973 | 10/2011 | ............. G08G 1/00 |
| JP | 2011215973 A | 10/2011 | |
| JP | 2012-118909 | 6/2012 | ............. G08G 1/16 |
| JP | 2012118909 A | 6/2012 | |
| JP | 2013-118514 A | 6/2013 | ............. G02B 3/00 |
| JP | 2015212941 A | 11/2015 | |
| WO | 2009-098154 | 8/2009 | ............. G01C 21/30 |
| WO | 2009098154 | 8/2009 | |

OTHER PUBLICATIONS

Japan Patent Office Notification of Reasons for Refusal for application 2019-528676, dated Jul. 8, 2020. With translation.
European Patent Office. Extended European Search Report for application 16922592.7, dated Jul. 7, 2020.
Notification of Reasons for Refusal for JP Application No. 2019-528676, 4 pages, dated Jul. 8, 2020.
Extended European Search Report for EP Application No. 16922592.7, 9 pages, dated Jul. 7, 2020.
Japan Patent Office. Decision to Grant a Patent for application 2019-528676, dated Feb. 17, 2021. With translation. 5 pages.

* cited by examiner

ENVIRONMENT MODEL USING CROSS-SENSOR FEATURE POINT REFERENCING

CROSS-REFERENCE TO RELATED APPLICATIONS

This application is a U.S. National Stage Application of International Application No. PCT/CN2016/107748 filed Nov. 29, 2016, which designates the United States of America, the contents of which are hereby incorporated by reference in their entirety.

TECHNICAL FIELD

The present disclosure pertains to mapping or scanning of an environment and determining a location in said environment.

BACKGROUND

Advanced driver assistance systems and autonomously driving cars require high precision maps of roads and other areas on which vehicles drive. Determining a vehicle's position on a road or even within a lane of a road with an accuracy of a few centimeters cannot be achieved using conventional satellite navigation systems, e.g. GPS, Galileo, GLONASS, or other known positioning techniques like triangulation and the like. Nonetheless, when a self-driving vehicle moves on a road with multiple lanes, it needs to exactly determine its lateral and longitudinal position within the lane.

One known way to determine a vehicle's position with high precision involves one or more cameras capturing images of road markings and comparing unique features of road markings or objects along the road in the captured images with corresponding reference images obtained from a database, in which reference image the respective position of road markings or objects is provided. This way of determining a position provides sufficiently accurate results only when the database provides highly accurate position data with the images and when it is updated regularly or at suitable intervals. Road markings may be captured and registered by special purpose vehicles that capture images of the roads while driving or may be extracted from aerial photographs or satellite images. The latter variant may be considered advantageous since a perpendicular view, or top-view image shows little distortion of road markings and other features on substantially flat surfaces. However, aerial photographs and satellite images may not provide sufficient detail for generating highly accurate maps of road markings and other road features. Also, aerial photographs and satellite images are less suitable for providing details on objects and road features that are best viewed from a ground perspective.

Most systems for positioning that are in use today, such as Simultaneous Localization And Mapping (SLAM) and other machine vision algorithms, generate and use feature points. Feature points can be salient points or salient regions in a two-dimensional image generated by a 2D-sensor, e.g. a camera, or in a two-dimensional representation of an environment generated by a scanning sensor. Those salient points or regions may carry some information about a third dimension, but are usually defined and used in two-dimensional representations, since machine-vision or robot-vision is typically implemented using cameras which provide two-dimensional information.

A set of feature points can be used for determining a position within a certain range, e.g. along a stretch of a road. In image-based positioning, or, generally, in positioning based on some form of representation of an environment, feature points for a particular part of an environment are provided in so-called key images, key frames or reference frames for that part of the environment. For the sake of clarity the expression 'reference frame' will be used throughout this document when referring to a reference representation of a part of an environment.

Reference frames can be two-dimensional pictures with a picture plane and one or more feature points identified therein. Feature points can be identified by processing camera images with filter or other optical processing algorithms, in order to find suitable image content that can be used as feature points. Image content that can be used for feature points may relate to objects and markings in the image, but this is no mandatory requirement. A salient point or salient region of an image that qualifies as feature point is basically sticking out from other areas or points in the image for a particular image processing algorithm used, e.g. by its shape, contrast, color, etc. Feature points can be independent from an object's shape or appearance in the image and can also be independent from each other but may also correspond to a recognizable object. Thus, in this context saliency does not exclusively refer to structures, or outlines of structures, colors, etc., that would appear conspicuous to a human observer. Rather, saliency can refer to any property of a part of a scene as "seen" or identified by a particular algorithm applied to a representation of the scene as captured by a particular type of sensor, which property renders the part sufficiently distinct from other parts of the representation of the scene.

A set of reference frames, each containing one or more feature points, can be construed as a map which can be used for machine orientation. It can be used by a robot or an autonomous vehicle to learn about its environment, to improve the result by combining the results of several scanning passes and to orientate itself within that environment by using the reference frames.

Different types of sensors generate different types of representations of a scene. A photographic camera produces an image that is quite different from a representation generated by a radar sensor, an ultrasonic sensor array or a scanning laser sensor. Objects or features visible in the environment may appear in different resolutions, but also have different shapes, depending on the way the sensor "sees" or captures the object or feature. Also, one camera image may produce color images, while a radar sensor, an ultrasonic sensor array, a scanning laser or even another camera do not. In addition, different cameras may have different resolutions, focus lengths, lens apertures and the like, which may also result in different feature points for each camera. Further, different algorithms for identifying feature points may be applied to different representations of a scene produced by different types of sensors. Each algorithm may be optimized for a specific representation generated by a certain type of sensor.

Thus, as a result of different sensor types and their specific processing the feature points found in respective reference frames may be sensor- and/or algorithm-specific. Representations of a scene or an environment generated by sensors of different types subjected to machine vision methods may produce feature points in one representation which are not found in another representation and may also result in a different numbers of feature points available for positioning across representations originating from different sensors.

Machines or vehicles that need to determine their location or position may not be equipped with all conceivable types of sensors and, even if they are, different sensors may have imaging properties that are not suitable for certain environmental conditions. For example, a radar sensor may operate largely unhampered at times of fog, or rain, while a camera may not produce useful results under such environmental conditions, and an underwater robot may "see" better with sonar. In such situations the number of representations of a scene or an environment that provide useful feature points may be low, and determining a position may take longer, be less accurate or impossible.

SUMMARY

The teachings of the present disclosure may be used to improve the positioning using multiple types of sensors. Some embodiments incorporate a larger number of feature points for any given location across a larger number of sensor types, but also accelerate the identification of feature points in different representations during the positioning process. For example, some embodiments include a method of generating an environment reference model for positioning comprising: receiving multiple data sets representing a scanned environment, the data sets also comprising information about the type of sensor used and data for determining an absolute position of objects and/or feature points represented by the data sets, extracting one or more objects and/or feature points from each of the data sets, and determining positions of the objects and/or feature points in a reference coordinate system, generating a three-dimensional vector representation of the scanned environment that is aligned with the reference coordinate system and in which the objects and/or feature points are represented at corresponding locations, creating links between the objects and/or feature points in the three-dimensional vector model with at least one type of sensor by use of which they can be detected in the environment, and storing the three-dimensional vector model representation and the links in a retrievable manner.

As another example, some embodiments include a method of adaptively providing a reference frame of a first environment for positioning comprising: receiving a request for a reference frame for the first environment from a requesting entity, wherein the request includes at least one type of sensor available for creating a local representation of the environment, retrieving a three-dimensional vector model representation comprising the first environment from a storage, generating, from the three-dimensional vector model, a first reference frame that includes at least those feature points for which a link with the at least one type of sensor exists, and transmitting the first reference frame to the requesting entity.

As another example, some embodiments include a method of determining a position of a mobile entity in an environment comprising: receiving a reference frame for the environment, wherein the reference frame includes information about objects and/or feature points in the environment that can be detected by the first type of sensor, extracting, from the reference frame, information about at least one object and at least one feature point as detectable by the first type of sensor, scanning an environment using a first type of sensor, finding and identifying at least one object included in the reference frame in a representation of the scanned environment generated by the first type of sensor, wherein a search area for finding and identifying the at least one object may be specified based on information about objects provided with the reference frame, finding and identifying at least one feature point in the sensor representation of the environment, wherein a search area for finding and identifying the at least one feature point may be specified based on information about feature points provided with the reference frame, and determining a position in the environment using the at least one feature point identified in the sensor representation of the environment and information about an absolute position of the at least one feature point extracted from the reference frame.

In some embodiments, the method includes receiving a reference frame of the environment including the object, wherein the reference frame includes information about objects and/or feature points in the environment that can be detected by the first type of sensor and the second type of sensor, extracting, from the reference frame, information about the object and feature points in respect of the identified object as detectable by the first type of sensor and the second type of sensor, scanning the environment using a second type of sensor in addition to the first type sensor, finding and identifying at least one object included in the reference frame in a representation of the environment generated by the first type of sensor at a first distance between the sensor and the object, wherein a search area for finding and identifying the at least one object may be specified based on information about objects provided with the reference frame, finding and identifying, using the extracted information, the object in a representation of the environment generated by the second type of sensor at a second distance between the sensor and the object, wherein the second distance is smaller than the first distance, finding and identifying, using the extracted information, one or more feature points in the representation of the environment generated by the second type of sensor, and determining a position in the environment using at least the feature points identified in the representation of the environment generated by the second sensor, wherein the extracted information includes data about an absolute position of the feature points in the environment.

In some embodiments, the reference frame corresponds to a 3D vector representation including objects and/or feature points.

In some embodiments, the reference frame corresponds to a 3D vector representation including objects and/or feature points, and wherein determining a position includes matching a locally generated 3D vector representation with a received 3D vector representation.

As another example, some embodiments include an apparatus for generating an environment reference model for positioning comprising: a first module adapted to receive multiple data sets representing a scanned environment, the data sets also comprising information about the type of sensor used and data for determining an absolute position of objects and/or feature points represented by the data sets, a second module adapted to extract one or more objects and/or feature points from each of the data sets, and to determine positions of the objects and/or feature points in a reference coordinate system, a third module adapted to generate a three-dimensional vector representation of the scanned environment that is aligned with the reference coordinate system and in which the objects and/or feature points are represented at corresponding locations, a fourth module adapted to create links between the objects and/or feature points in the three-dimensional vector model with at least one type of sensor by use of which they can be detected in the environment, and a fifth module adapted to store the three-dimensional vector model representation and the links in a retrievable manner.

As another example, some embodiments include an apparatus for adaptively providing a reference frame of a first environment to a mobile entity for positioning, comprising: a sixth module adapted to receive a request from the mobile entity for a reference frame for the first environment, the request including at least one type of sensor available for creating a local representation of the environment, a seventh module adapted to retrieve a three-dimensional vector model representation comprising the first environment from a storage, an eighth module adapted to generate, from the three-dimensional vector model, a first reference frame that includes at least those feature points for which a link with the at least one type of sensor exists, and a ninth module adapted to transmit the first reference frame to the mobile entity.

As another example, some embodiments include an apparatus for determining a position of a mobile entity in an environment, comprising: a tenth module adapted to scan an environment using a first type of sensor, an eleventh module adapted to identify an object in a representation of the scanned environment generated by the first type of sensor, a twelfth module adapted to receive a reference frame for the environment including the object, the reference frame including information about objects and/or feature points in the environment that can be detected by the first type of sensor, a thirteenth module adapted to extract, from the reference frame, information about the object and at least one feature point in respect of the identified object as detectable by the first type of sensor, a fourteenth module adapted to indentify at least one feature point in the sensor representation of the environment using the information about objects and/or feature points from the reference frame, and a fifteenth module adapted to determine a position in the environment using the at least one feature point identified in the sensor representation of the environment and information about an absolute position of the at least one feature point extracted from the reference frame.

In some embodiments, the tenth module is adapted to scan the environment using a second type of sensor in addition to using the first type of sensor, the eleventh module is adapted to identify an object in a representation of the environment generated by the first type of sensor at a first distance between the sensor and the object, the twelfth module is adapted to receive a reference frame for the environment including the object, the reference frame including information about objects and/or feature points in the environment that can be detected by the first type of sensor and the second type of sensor, the thirteenth module is adapted to extract, from the reference frame, information about the object and at least one feature point in respect of the identified object as detectable by the first type of sensor and the second type of sensor, the fourteenth module is adapted to identify, using the extracted information, the object in a representation of the environment generated by the second type of sensor at a second distance between the sensor and the object, the second distance being smaller than the first distance, and to identify, using the extracted information, one or more feature points in the representation of the environment generated by the second type of sensor, and the fifteenth module is adapted to determine a position in the environment using the at least one feature point identified in the representation of the environment generated by the second type of sensor and information about an absolute position of the at least one feature point extracted from the reference frame.

BRIEF DESCRIPTION OF THE DRAWINGS

In the following section the teachings of the present disclosure are described with reference to the attached drawings, in which.

DETAILED DESCRIPTION

Figure 1:
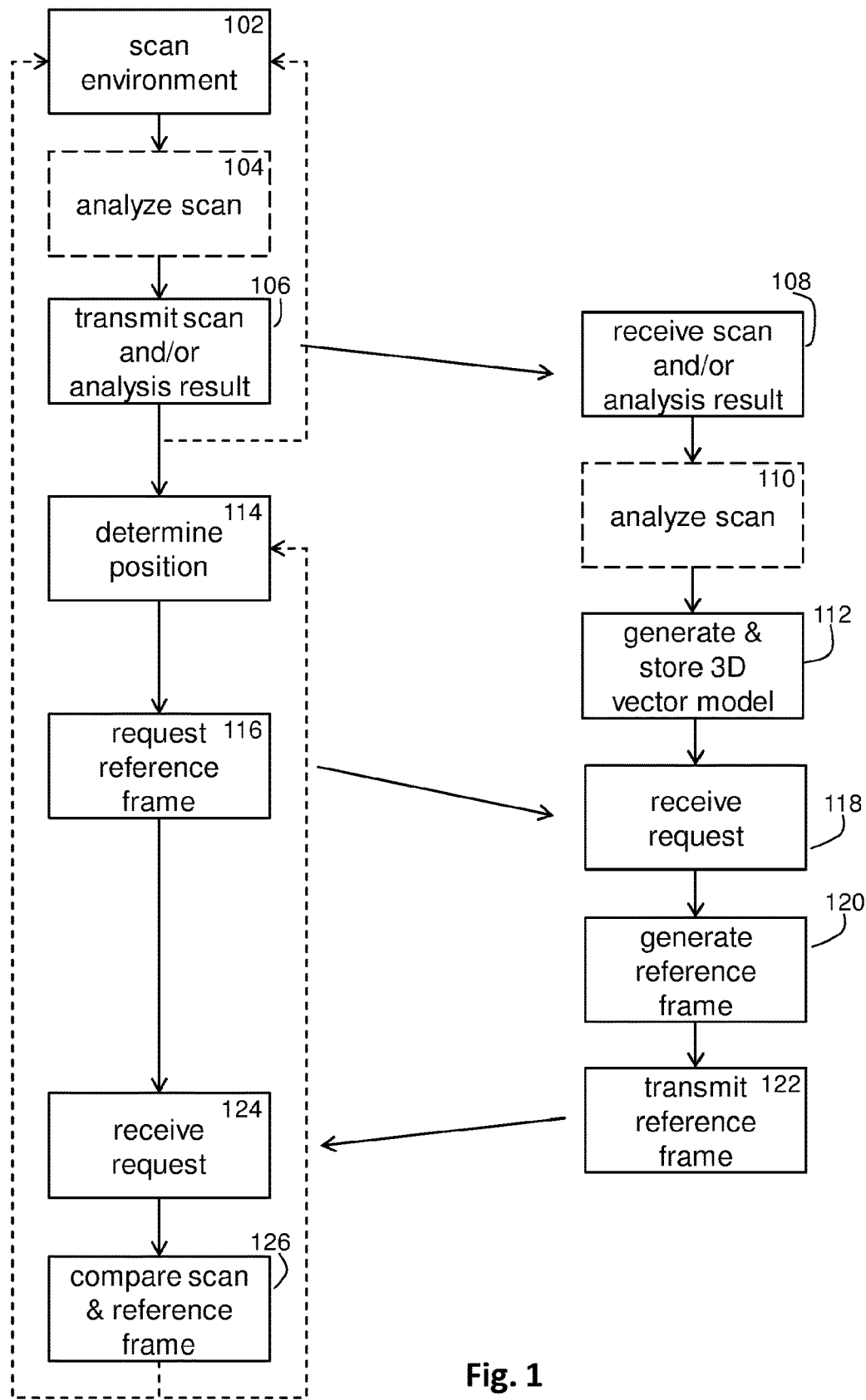
FIG. 1 shows an exemplary simplified flow chart of a method incorporating teachings of the present disclosure.

The present disclosure describes addressing the aforementioned problems by generating, in a first aspect, a generic description of an environment, or environment reference model, which description or model includes feature points for a large range of sensor types and/or environmental conditions. The generic description can be construed as a high level description of the environment, which may serve as a basis for deriving reference frames for various sensor types and/or environmental conditions. In some embodiments, the generic description or model of the environment is used as a data source for providing such reference frames to an apparatus that is moving in the environment, e.g. a vehicle or a robot, for orientation and positioning the apparatus. The reference frames comprise those features points that can be found in representations of the environment originating from different types of sensors available to the apparatus. In the following the apparatus moving in the environment is referred to as mobile entity.

In some embodiments, the high level description of the environment is a three-dimensional vector model, which contains 3D feature points. The 3D feature points may relate to three-dimensional objects in the three-dimensional vector model or may be linked thereto. As those 3D feature points are true 3D points with more information associated with them than is associated with 2D feature points commonly used today, i.e. a more detailed spatial description, they may be used as reference points for a variety of representations generated by different types of sensors. In other words, each reference point may carry attributes from known feature points for one sensor type plus additional attributes that characterize it for the different sensor types and their respective processing.

In some embodiments, feature points that stick out may be different for the same scene, depending on the sensor and the processing used. This may render individual feature points useful for one sensor representation, but unusable for another sensor representation. In some embodiments, objects that can be defined, e.g., by their outline, and that have attributes associated with them in a more abstract way, can be identified rather easily in different representations originating from different types of sensors. Once the object as such is identified, one or more feature points associated with the identified object and a particular sensor type can be obtained, identified in a corresponding locally generated sensor representation of the object and used for determining a relative position with respect to the object. Identifying an object may be facilitated by using the 3D vector model, which may already include locations of objects.

In this case, only those locations in a sensor representation need to be analyzed, and a shape of an object may also be easier identified in the sensor representation when it is known beforehand from data provided by the 3D vector model. Identifying feature points for specific sensor types in an object may include referring to instructions on how to find feature points, which are associated with the object in the three-dimensional vector model. The instructions may include filter or processing parameters for filtering or processing representations of the scene as generated by the different types of sensors in order to locate feature points or may include positions of feature points with respect to an object, e.g. an outline of an object. If the absolute position of the object or of one or more feature points associated with the object is known, an absolute position can be determined in a simple fashion. Individual feature points may be used for determining a position. However, if a plurality of feature points from one object, from a plurality of different objects or feature points that are not related to objects form a specific and unique pattern such pattern may be used for determining a position. This may, for example, allow for determining a position using feature points associated with a plurality of road markings that form a unique pattern.

In some embodiments, a method of generating an environment reference model for positioning comprises receiving a plurality of data sets representing a scanned environment. The data sets may be generated by a plurality of mobile entities while moving in the environment. The data also comprises information about objects and/or feature points identified in the scanned environment and the type of sensor used and may also comprise sensor properties and data for determining an absolute position of feature points and/or objects represented by the data. Data for determining an absolute position of feature points and objects may include a geographical position expressed in a suitable format, e.g. latitude and longitude, but may also simply consist of the data describing an object. In the latter case the position of the object is determined by obtaining corresponding information from a database for the object's position once the object is identified. An absolute position of feature points of the object can then be determined from the object's known position using known properties of the object and the sensor.

In some embodiments, the method further comprises generating, from the received data sets, a three-dimensional vector representation of the scanned environment that is aligned with a reference coordinate system and in which the objects and/or feature points are represented at corresponding locations. The received data sets may represent the scanned environment in the form of a locally generated three-dimensional vector model, which includes at least the objects and/or feature points at corresponding locations therein, as well as information about a sensor type used for determining the objects and feature points. Receiving such three-dimensional vector model representation of the scanned environment may facilitate assembling received partial representations of a larger environment into a global environment reference model. The fact that some processing capacity at the source of the data is required may be irrelevant at least in case the source anyway generates three-dimensional vector model for determining its own position within the environment.

The received three-dimensional vector model may be aligned with an already existing three-dimensional vector representation of the environment reference model, or parts thereof, by matching objects and/or feature points. In case a received data set shares no part with the existing environment reference model, location and/or orientation information that is provided in the received data set may be used for non-contiguously aligning the received three-dimensional vector model within blank areas of the already existing environment reference model.

However, the received data sets may also represent the scanned environment in other forms, including but not limited to pictures or images of the environment, or other picture-like representations thereof, enhanced by indications of feature points. Other forms include processed, abstract representations, e.g. machine readable descriptions of objects, features of objects and the like, or identified feature points, and their locations in the environment. One or more forms of representations may require a reduced amount of data during transmission and for storing and may therefore be preferred over other forms.

In some embodiments, the method further comprises extracting objects and/or feature points from each of the data sets. In particular in case the received data sets do not represent the scanned environment in the form of a locally generated three-dimensional vector model, extracting may include analyzing pictures, images or abstract representations for identifying objects and/or feature points, or using identified feature points from the data sets. Once the feature points and/or objects are extracted, positions of the objects and/or feature points in a reference coordinate system are determined. The reference coordinate system may be aligned with absolute geographical coordinates. The data sets may optionally include information about environmental conditions prevailing when generating the data, which information may be useful, e.g. for assigning confidence values to the data, or for selecting appropriate algorithms for identifying feature points.

In some embodiments, the method yet further comprises creating links between the objects and/or feature points in the three-dimensional vector model with at least one type of sensor by use of which they can be detected in the environment, and storing the three-dimensional vector model representation and the links in a retrievable manner.

In some embodiments, a method of adaptively providing a reference frame of a first environment for positioning comprises receiving a request for a reference frame for the first environment. The first environment may be a part of a larger environment in which a vehicle or other mobile entity is moving and in which it needs to determine its position. The request also includes information about at least one type of sensor available for creating a local representation of the environment. The reference frame may comprise a 3D vector model including objects and feature points, and any reference herein to a reference frame includes such 3D vector model.

The request for the reference frame of the first environment may include an indication of the location of the environment and/or a viewing or travelling direction, which allows for identifying one or more candidate reference frames. This may be used in case a reference frame for a comparatively small first environment is to be transmitted, e.g. due to limited storage capacity for reference frames at the receiver side. In case of very large storage capacity at the receiver side reference frames for a larger part of an environment may be transmitted. An indication of the location of the environment may include coordinates from a satellite navigation system but may also merely include one or more identifiable objects by means of which the location may be determined. In case a unique identifiable object is identified, this unique identifiable object, e.g. the Eiffel tower, may suffice to coarsely determine the location and to provide suitable reference frames.

In some embodiments, the method further comprises retrieving a three-dimensional vector model representation comprising the first environment from a storage, and generating, from the three-dimensional vector model, a first reference frame that includes at least those feature points for which a link or an association with the at least one type of sensor exists. If the first reference frame includes only those feature points linked with sensor types available at the receiver the amount of data to be transmitted can be reduced, even though, depending on the amount of data required for describing a feature point and on the data rate of a communication connection used in specific implementations, this may not be necessary. The first reference frame can be a two-dimensional image or a graphical abstract image of the first environment, but may also be represented as a three-dimensional representation, e.g. in the form of a stereoscopic image, hologram data, or a 3D vector representation of the first environment. The first reference frame is transmitted to the requesting entity in response to the request.

The methods described hereinbefore may be executed by a server or database which is remote from a mobile entity that is moving in the environment. In this case receiving and transmitting may simply be a transmission within different components of the mobile entity. The components may be separate hardware components or separate software components executed on the same hardware.

In some embodiments, for determining a location or a position of a mobile entity in the environment an object found in a locally generated sensor representation of the environment is identified in a received first reference frame. Finding and identifying the object in the sensor representation of the scanned environment may be supported by information provided in the received first reference frame. This may be done for each sensor type that is locally available. The reference frame may be received from a remote server or database, or form a server or database provided with the mobile entity. Once the object is identified, data pertaining to one or more feature points and its relation to the object provided in the reference frame is used for locating the one or more feature points in the sensor representation of the environment. The data, which may be received with the reference frame, may include filter settings or processing parameters that facilitate locating the feature points in the representation of the environment, or simply limit the area in which the feature points are searched. Once the feature points are found in the sensor representation of the environment they can be used for determining a position relative to the object, e.g. by matching with the feature points of the reference frame, taking into account the properties of the sensor such as, e.g., field of view, orientation, etc. If absolute positions of the one or more feature points are provided in the reference frame an absolute position in the environment can be determined. It is reminded that a reference frame may also be a 3D vector representation of the environment, and that feature points may be matched for determining a position by matching a received 3D vector model with a locally generated 3D vector model. The reference frame may, for example, be provided to an advanced driver assistance system (ADAS) of a vehicle, which uses the data provided therein for determining a current position of the vehicle as well as for generating control data for vehicle controls, e.g. accelerometer, braking systems and the like.

If two or more sensors are used, they will not typically all be in the same position, and they will not be facing in the same direction. Also, the rates at which representations of the environment are generated or updated may be different. A reference frame, or even a true 3D vector graphics model can be rendered for each updated representation of the environment for each sensor, using information about the position of each sensor and its respective position and bearing. This way, the objects and thus the feature points can be identified quickly and with low processing overhead in the different representations of the environment.

In some embodiments, an environment is scanned by a first and a second type of sensors, and an object is identified in a representation of the environment generated by a first type of sensor at a first distance between the object and the sensor. A reference frame of the environment including the identified object is received, and information about the object and feature points in respect of the identified object as detectable by the first and the second type of sensor is extracted from the reference frame. The reference frame may be a 3D vector representation including objects and feature points.

When approaching the object, at a second distance that is smaller than the first distance the object is also identified in a representation of the environment generated by the second type of sensor, using the extracted information. Also using the extracted information, the feature points in the representation of the environment generated by the second sensor are identified, and a position is determined in the environment using at least the feature points identified in the representation of the environment generated by the second sensor. As the object has already been identified and the sensor types are known, locations of feature points with respect to the object can be found easier and faster in the representation of the environment generated by the second type of sensor, because the locations of the feature points in respect of the object for both sensor types are provided in the reference frame of the environment. Thus, once the object is identified in the representation of the environment generated by the second type of sensor the sensor data processing can be primed to search for the feature point only in those parts of the representation that are known to include feature points. The extracted information may include data about an absolute position of the feature points in the environment, allowing for determining a position within the environment.

In case the second type of sensor provides a higher resolution representation of the environment, allowing for more precisely determining a location within the environment, such high precision location can be had easier and faster. This in turn may allow for moving in the environment at higher speeds without sacrificing safety.

This embodiment may also be useful in case the second type of sensor is impaired by environmental conditions, e.g. fog, drizzle, heavy rain, snow and the like, while the first type of sensor is not. For example, a radar sensor of a vehicle driving along a road may detect an object at the road side at a large distance even though drizzle impairs the vision of a camera that is also provided with the vehicle. Thus, the object may be found in a reference frame of the environment based on data from the radar sensor, and locations of feature points for both, radar and camera may be identified even though the camera does not yet provide a useful image. As the vehicle approaches the object the camera image provides useful images. As the location of the object is known from the reference frame and may have been tracked using the radar image, feature points can be identified easier and faster in the camera image by referring to information provided in the reference frame. Since the camera image may have a higher resolution, high precision positioning of the vehicle can be had easier and faster as compared to a situation in which the feature points have to be identified anywhere in the camera image without any hint where to look. In other words, a kind of cooperation between different types of sensor is enabled through the reference frame of the environment and the data provided therein.

In some embodiments, a first apparatus for generating an environment reference model for positioning comprises a first module adapted to receive multiple data sets representing a scanned environment, the data sets also comprising information about the type of sensor used and data for determining an absolute position of objects and/or feature points represented by the data sets. The first apparatus further comprises a second module adapted to extract one or more objects and/or feature points from each of the data sets, and to determine positions of the objects and/or feature points in a reference coordinate system. The first apparatus yet further comprises a third module adapted to generate a three-dimensional vector representation of the scanned environment that is aligned with the reference coordinate system and in which the objects and/or feature points are represented at corresponding locations. The first apparatus also comprises a fourth module adapted to create links between the objects and/or feature points in the three-dimensional vector model with at least one type of sensor by use of which they can be detected in the environment, and a fifth module adapted to store the three-dimensional vector model representation and the links in a retrievable manner.

In some embodiments, a second apparatus for adaptively providing a reference frame of a first environment for positioning comprises a sixth module adapted to receive a request for a reference frame for the first environment, the request including at least one type of sensor available for creating a local representation of the environment. The second apparatus further includes a seventh module adapted to retrieve a three-dimensional vector model representation comprising the first environment from a storage, and an eighth module adapted to generate, from the three-dimensional vector model, a first reference frame that includes at least those feature points for which a link with the at least one type of sensor exists. The second apparatus yet further includes a ninth module adapted to transmit the first reference frame to the requesting entity.

In some embodiments, a third apparatus for determining a position of a mobile entity in an environment comprises a tenth module adapted to scan an environment using a first type of sensor, and an eleventh module adapted to identify an object in a representation of the scanned environment generated by the first type of sensor. The third apparatus further comprises a twelfth module adapted to receive a reference frame for the environment including the object, the reference frame including information about objects and/or feature points in the environment that can be detected by the first type of sensor, and a thirteenth module adapted to extract, from the reference frame, information about the object and at least one feature point in respect of the identified object as detectable by the first type of sensor. The third apparatus yet further comprises a fourteenth module adapted to identify at least one feature point in the sensor representation of the environment using the information about objects and/or feature points from the reference frame, and a fifteenth module adapted to determine a position in the environment using the at least one feature point identified in the sensor representation of the environment and information about an absolute position of the at least one feature point extracted from the reference frame.

In some embodiments, the tenth module is adapted to scan the environment using a second type of sensor in addition to using the first type of sensor, and the eleventh module is adapted to identify an object in a representation of the environment generated by the first type of sensor at a first distance between the sensor and the object. The twelfth module is adapted to receive a reference frame for the environment including the object, the reference frame including information about objects and/or feature points in the environment that can be detected by the first type of sensor and the second type of sensor. The thirteenth module is adapted to extract, from the reference frame, information about the object and at least one feature point in respect of the identified object as detectable by the first type of sensor and the second type of sensor. The fourteenth module is adapted to identify, using the extracted information, the object in a representation of the environment generated by the second type of sensor at a second distance between the sensor and the object, the second distance being smaller than the first distance, and to identify using the extracted information, one or more feature points in the representation of the environment generated by the second type of sensor. The fifteenth module is adapted to determine a position in the environment using the at least one feature point identified in the representation of the environment generated by the second type of sensor and information about an absolute position of the at least one feature point extracted from the reference frame.

In some embodiments, one or more of the modules may comprise dedicated hardware modules, each with one or more microprocessors, random access memory, non-volatile memory and interfaces for inter-module communication as well as communication with data sources and data sinks that are not an integral part of the system. References to modules for receiving or transmitting data, even though referred to above as separate modules, may be implemented in a single communication hardware device, and separated only by the role they perform in the system or the software used for controlling the communication hardware to perform the module's function or role.

In some embodiments, one or more of the modules may comprise computer software programs, executed on a computer and providing the respective module's function. Combinations of dedicated hardware modules and computer software programs are also conceivable.

The present method and apparatus allow for determining a position or location in an environment using compact data sets, updating of which requires comparatively small amounts of data to be sent and received. In addition, a significant part of the image and data processing and data fusion is carried out in central servers, thereby reducing the requirements for processing power in the mobile apparatus or devices. Further, a single 3D vector graphics model may be used for on-demand generating reference frames for a selection of sensor types, excluding feature points that are not detectable by the selected sensor types. Thus, irrespective of the type of sensor used for scanning an environment and objects therein, feature points can be found easier and quicker in the scanned environment by referring to the 3D vector graphics model and the information provided therein, and a position in the environment can be determined easier and quicker.

In case a vehicle moves in an environment for which a 3D vector model has previously been generated, the reference frame provided to the vehicle is a 3D vector model and the vehicle locally generates a 3D vector model when scanning the vehicle can easily align its locally generated 3D vector model with the one received as reference frame. Also, the server generating and providing the environment reference model can easily align locally generated 3D vector models received in the data sets with its environment reference model using identified feature points.

FIG. 1 shows an exemplary simplified flow chart of a method 100 incorporating teachings of the present disclosure. In step 102, an environment is scanned using one or more sensors of different type. The scanning may be carried out continuous or periodically at fixed or variable intervals. The representation of the environment generated by scanning is analyzed in step 104 for identifying objects and/or feature points. Step 104 may also include generating a three-dimensional vector model of the environment and the identified objects and/or feature points. The representation of the environment generated by scanning in step 102 and/or the results of the analysis carried out instep 104 are transmitted to a remote server or database in step 106. Steps 102 through 106 are carried out by a mobile entity that is moving in the environment.

In step 108, the representation of the environment generated by scanning in step 102 and/or the results of the analysis carried out in step 104 are received by the remote server or database, and may be further analyzed in optional step 110. Whether or not a further analysis is carried out may depend from the received data, i.e., whether the data requires analysis for identifying objects and/or feature points or does not require such analysis because what was received is already in the form of a three-dimensional vector model. In step 112, a three-dimensional reference model of the environment including objects and/or feature points and their locations is generated. This may include matching or aligning received three-dimensional vector models or three-dimensional vector models generated in step 110, in order to obtain a coherent global three-dimensional reference model. Steps 108 through 112 may be carried out by the remote server or database.

Returning to the mobile entity, the mobile entity determines, in step 114, its position in the environment while moving, e.g. using a locally available environment model, satellite navigation, or the like. At some point in time the mobile entity, in step 116, requests a reference frame of the environment in which it is presently moving, in order to determine its position. Requesting a reference frame may be done periodically or event-triggered, e.g. depending on a distance covered since the last reference frame was requested. In step 118, the remote server or database receives the request and generates the requested reference frame for the corresponding position in step 120. The requested reference frame is transmitted, step 122, to the mobile entity, which receives the reference frame in step 124, and uses it, in step 126, for determining its position in the environment by comparing locally generated scan data and/or a locally generated three-dimensional vector model with data provided in the reference frame.

The dashed lines closing loops between steps 106 and 102, steps 126 and 114 and steps 126 and 102 indicate repetitive or continuous execution of the method or of individual loops. Other loops are also conceivable, depending on the requirements and implementation of the method in the mobile entity.

Figure 2:
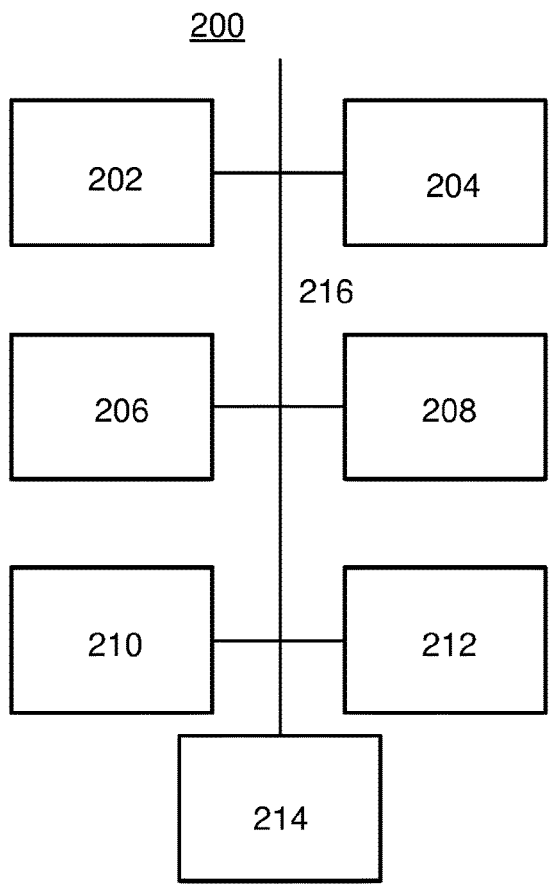
FIG. 2 shows an exemplary simplified block diagram of a mobile system incorporating teachings of the present disclosure.

FIG. 2 shows an exemplary simplified block diagram of a mobile system 200 incorporating teachings of the present disclosure. A scanner 202 using a first type of sensor for scanning an environment in which the mobile system is moving, an apparatus for determining a position 204 within the environment, a module 206 for identifying an object in a representation of the scanned environment, a module 208 for receiving a 3D vector graphics model of the environment including the object, a module 210 for extracting, from the 3D vector graphics model, information about the object and at least one feature point in respect of the identified object as detectable by the first type of sensor, a module 212 for identifying at least one feature point in the sensor representation of the environment using the information about objects and/or feature points from the 3D vector graphics model, and a module 214 for determining a position in the environment using the at least one feature point identified in the sensor representation of the environment and information about an absolute position of the at least one feature point extracted from the 3D vector graphics model are communicatively connected via one or more bus systems 216.

Modules 206, 208, 210, 212 and/or 214 may include one or more microprocessors, random access memory, non-volatile memory and software and/or hardware communication interfaces. The non-volatile memory may store computer program instructions which, when executed by the one or more microprocessor in cooperation with the random access memory, perform one or more processing steps of the method as presented hereinbefore.

Figure 3:
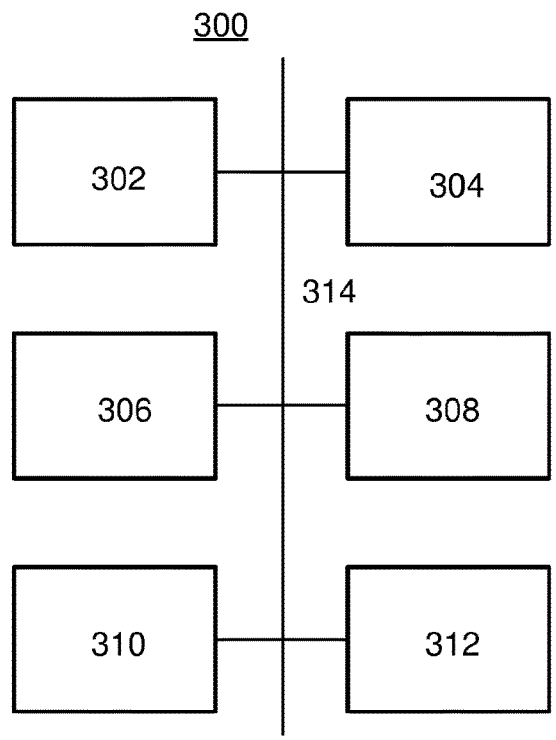
FIG. 3 shows an exemplary simplified block diagram of a remote system incorporating teachings of the present disclosure.

FIG. 3 shows an exemplary simplified block diagram of a remote system 300 incorporating teachings of the present disclosure. A module 302 for communicating with a mobile entity, communicating including receiving multiple data sets representing a scanned environment, receiving requests for reference frames and transmitting reference frames, a module 304 for extracting one or more objects and/or feature points from each of the data sets, and determining positions of the objects and/or feature points in a reference coordinate system, a module 306 for generating a three-dimensional vector representation of the scanned environment that is aligned with the reference coordinate system and in which the objects and/or feature points are represented at corresponding locations, a module 308 for creating links between the objects and/or feature points in the three-dimensional vector model with at least one type of sensor by use of which they can be detected in the environment, a module 310 for storing the three-dimensional vector model representation and the links in a retrievable manner, and a module 312 for retrieving a three-dimensional vector model representation in accordance with a request for a reference frame from a storage and generating, from the three-dimensional vector model, a first reference frame that includes at least those feature points for which a link with the at least one type of sensor exists are communicatively connected via one or more bus systems 314.

Modules 302, 304, 306, 308, 310 and/or 312 may include one or more microprocessors, random access memory, non-volatile memory and software and/or hardware communication interfaces. The non-volatile memory may store computer program instructions which, when executed by the one or more microprocessor in cooperation with the random access memory, perform one or more processing steps of the method as presented hereinbefore.

What is claimed is:

1. A method of generating an environment reference model for positioning, the method comprising:
receiving multiple data sets representing a scanned environment including information about a type of sensor used and data for determining an absolute position of objects or feature points represented by the data sets;
extracting one or more objects or feature points from each data set;
determining a respective position of each of the objects or feature points in a reference coordinate system;
generating a three-dimensional vector representation of the scanned environment aligned with the reference coordinate system including representation of the objects or feature points at corresponding locations;

creating links between the objects or feature points in the three-dimensional vector model with an identified type of sensor by which they can be detected in the environment; and storing the three-dimensional vector model representation and the links in a retrievable manner.

2. A method of determining a position of a mobile entity in an environment, the method comprising:

receiving a reference frame for the environment, wherein the reference frame includes information about objects or feature points in the environment that can be detected by a first type of sensor;

extracting from the reference frame information about an object and a feature point both detectable by the first type of sensor;

scanning an environment using a sensor of the first type;

finding and identifying the object included in the reference frame in a representation of the scanned environment generated by the sensor, wherein a search area for finding and identifying the object is specified based on information about objects provided with the reference frame;

finding and identifying the feature point in the sensor representation of the environment, wherein a search area for finding and identifying the feature point is specified based on information about feature points provided with the reference frame; and determining the position of the mobile entity in the environment using the feature point identified in the sensor representation of the environment and information about an absolute position of the feature point extracted from the reference frame.

3. The method of claim 2, further comprising:

receiving a reference frame of the environment including the object, wherein the reference frame includes information about objects or feature points in the environment detectable by the first type of sensor and a second type of sensor;

extracting from the reference frame information about the object and feature points with respect to the identified object as detectable by the first type of sensor and the second type of sensor;

scanning the environment using a sensor of the second type;

finding and identifying an object included in the reference frame in a representation of the environment generated by the first type of sensor at a first distance between the sensor and the object, wherein a search area for finding and identifying the object is specified based on information about objects provided with the reference frame;

finding and identifying, using the extracted information, the object in a representation of the environment generated by the second type of sensor at a second distance between the second type of sensor and the object, wherein the second distance is smaller than the first distance;

finding and identifying, using the extracted information, the feature point in the representation of the environment generated by the second type of sensor; and determining the position of the mobile entity in the environment using the feature points identified in the representation of the environment generated by the second sensor, wherein the extracted information includes data about an absolute position of the feature points in the environment.

4. The method of claim 2, wherein the reference frame corresponds to a 3D vector representation including objects or feature points.

5. The method of claim 2, wherein:

the reference frame corresponds to a 3D vector representation including objects or feature points; and determining a position includes matching a locally generated 3D vector representation with a received 3D vector representation.

6. An apparatus for generating an environment reference model for positioning, the apparatus comprising:

a memory storing a set of instructions; and a processor in communication with the memory configured to retrieve the set of instructions from the memory and execute the set of instructions;

wherein the set of instructions, when loaded and executed by the processor, cause the processor to:

receive multiple data sets representing a scanned environment, the data sets comprising information about a type of sensor used and data for determining an absolute position of objects and/or feature points represented by the data sets;

extract an object and/or a feature point from each of the data sets;

determine a position of the object and/or the feature point in a reference coordinate system;

generate a three-dimensional vector representation of the scanned environment aligned with the reference coordinate system wherein the object and/or feature point is represented at a corresponding location;

create links between the object and/or feature point in the three-dimensional vector model using a first type of sensor by which the object and/or feature point can be detected in the environment; and store the three-dimensional vector model representation and the links in the memory.

7. An apparatus for determining a position of a mobile entity in an environment, the apparatus comprising:

a memory storing a set of instructions; and a processor in communication with the memory configured to retrieve the set of instructions from the memory and execute the set of instructions;

wherein the set of instructions, when loaded and executed by the processor, cause the processor to:

scan an environment using a first sensor of a first type;

identify an object in a representation of the scanned environment generated by the first sensor;

receive a reference frame for the environment including the object, the reference frame including information about objects and/or feature points in the environment detectable by the first type of sensor;

extract from the reference frame information about the object and a feature point with respect of the identified object as detectable by the first type of sensor;

identify the feature point in the sensor representation of the environment using the information about objects and/or feature points from the reference frame; and determine a position in the environment using the feature point identified in the sensor representation of the environment and information about an absolute position of the feature point extracted from the reference frame.

8. The apparatus of claim 7, wherein the set of instructions further comprises instructions to:
- scan the environment using a second sensor of a second type;
- identify an object in a representation of the environment generated by the first sensor at a first distance between the first sensor and the object;
- receive a reference frame for the environment including the object, the reference frame including information about objects and/or feature points in the environment that can be detected by the first type of sensor and the second type of sensor;
- extract from the reference frame information about the object and the feature point with respect to the identified object as detectable by the first type of sensor and the second type of sensor;
- identify using the extracted information the object in a representation of the environment generated by the second type of sensor at a second distance between the second type of sensor and the object, the second distance being smaller than the first distance;
- identify using the extracted information a feature points in the representation of the environment generated by the second type of sensor; and
- determine a position in the environment using the feature point identified in the representation of the environment generated by the second type of sensor and information about an absolute position of the feature point extracted from the reference frame.

\* \* \* \* \*